United States Patent
Schuck, III et al.

(10) Patent No.: US 12,019,239 B2
(45) Date of Patent: Jun. 25, 2024

(54) METHOD AND SYSTEM FOR COLOR CALIBRATION OF AN IMAGING DEVICE

(71) Applicant: Magic Leap, Inc., Plantation, FL (US)

(72) Inventors: Miller Harry Schuck, III, Erie, CO (US); Lei Zhang, Sunnyvale, CA (US); Etienne Gregoire Grossmann, Menlo Park, CA (US); Nukul Sanjay Shah, Plantation, FL (US); Ohad Zohar, Tel Aviv (IL); Robert Zito, Hillsdale, NJ (US); Nicholas Ihle Morley, Deerfield Beach, FL (US); Jason Schaefer, Coral Springs, FL (US); Zhiheng Jia, Weston, FL (US); Eric C. Browy, Meridian, ID (US); Marshall Charles Capps, Austin, TX (US); Kazunori Tanaka, Irvine, CA (US); Grace Vesom, San Jose, CA (US); John Monos, Venice, CA (US)

(73) Assignee: Magic Leap, Inc., Plantation, FL (US)

( * ) Notice: Subject to any disclaimer, the term of this patent is extended or adjusted under 35 U.S.C. 154(b) by 560 days.

(21) Appl. No.: 17/154,895

(22) Filed: Jan. 21, 2021

(65) Prior Publication Data

US 2021/0215536 A1 Jul. 15, 2021

Related U.S. Application Data

(63) Continuation of application No. PCT/US2019/043309, filed on Jul. 24, 2019.
(Continued)

(51) Int. Cl.
*G01J 3/02* (2006.01)
*G01J 3/46* (2006.01)
(Continued)

(52) U.S. Cl.
CPC ........ *G02B 27/0172* (2013.01); *G01J 3/0251* (2013.01); *G01J 3/462* (2013.01);
(Continued)

(58) Field of Classification Search
CPC ........ G02B 27/0172; G02B 2027/0116; G02B 2027/0138; G02B 2027/014;
(Continued)

(56) References Cited

U.S. PATENT DOCUMENTS 6,108,442 A * 8/2000 Edge .................... H04N 1/6097
358/518
6,225,974 B1 5/2001 Marsden et al.
(Continued)

FOREIGN PATENT DOCUMENTS

CN 107958470 A 4/2018
JP 2007208629 A 8/2007
(Continued)

OTHER PUBLICATIONS

U.S. Appl. No. 16/530,877, "Non-Final Office Action", dated Apr. 8, 2021, 45 pages.
(Continued)

*Primary Examiner* — Mohamed K Amara
(74) *Attorney, Agent, or Firm* — KILPATRICK TOWNSEND & STOCKTON LLP

(57) ABSTRACT

A method for characterizing a digital color camera includes, for each of three primary colors used in a field sequential color virtual image, determining a conversion model for each color using RGB values and the color-measurement values. For each primary color, the method includes illuminating a display device using an input light beam of a primary color having spectral properties representative of a light beam in a virtual image in a wearable device. The method includes capturing, with the digital color camera, an
(Continued)

image of the display device, and determining, from the image, RGB values for each primary color. The method includes capturing, with a color-measurement device, a color-measurement value associated with each corresponding primary color at the display device, thereby acquiring a color-measurement value in an absolute color space. A conversion model for each color is determined using RGB values and the color-measurement values.

18 Claims, 9 Drawing Sheets

Related U.S. Application Data

(60) Provisional application No. 62/702,809, filed on Jul. 24, 2018.

(51) Int. Cl.
  *G02B 27/01* (2006.01)
  *G06T 7/80* (2017.01)
  *G06T 7/90* (2017.01)

(52) U.S. Cl.
  CPC ............ *G06T 7/80* (2017.01); *G06T 7/90* (2017.01); *G06T 2207/10024* (2013.01)

(58) Field of Classification Search
  CPC ..... G02B 27/017; G02B 27/01; G01J 3/0251; G01J 3/465; G01J 3/506; G01J 3/46–463; G01J 3/412–492; G01J 2003/412–492; G01J 3/512–592; G01J 2003/512–592; G06T 7/80; G06T 7/90; G06T 2207/10024; G09G 3/003; G09G 2310/0235; G09G 2320/0693
  See application file for complete search history.

(56) References Cited

U.S. PATENT DOCUMENTS

| | | | | |
|---|---|---|---|---|
| 6,897,999 | B1* | 5/2005 | Bass | C09K 11/7773 |
| | | | | 365/151 |
| 8,055,070 | B2 | 11/2011 | Bassi et al. | |
| 8,654,141 | B2 | 2/2014 | Zhang et al. | |
| 9,934,595 | B2* | 4/2018 | Safaee-Rad | G01J 3/462 |
| 10,872,582 | B2* | 12/2020 | Wyble | G09G 5/02 |
| 11,037,522 | B2* | 6/2021 | Naccari | H04N 9/3182 |
| 11,361,474 | B2 | 6/2022 | Tanaka et al. | |
| 2002/0122044 | A1 | 9/2002 | Deering | |
| 2002/0126282 | A1* | 9/2002 | Aastuen | G01M 11/00 |
| | | | | 356/364 |
| 2003/0151667 | A1 | 8/2003 | Nakami et al. | |
| 2004/0061920 | A1 | 4/2004 | Tonar et al. | |
| 2005/0078187 | A1* | 4/2005 | Fabricius | H04N 17/02 |
| | | | | 348/E17.005 |
| 2005/0213128 | A1 | 9/2005 | Imai et al. | |
| 2006/0158881 | A1 | 7/2006 | Dowling | |
| 2006/0251408 | A1* | 11/2006 | Konno | G01J 3/0272 |
| | | | | 348/370 |
| 2008/0088858 | A1 | 4/2008 | Marcu et al. | |
| 2009/0021587 | A1* | 1/2009 | Snyderman | H04N 17/02 |
| | | | | 348/207.11 |
| 2011/0285763 | A1 | 11/2011 | Bassi et al. | |
| 2013/0050504 | A1 | 2/2013 | Safaee-rad et al. | |
| 2014/0028697 | A1 | 1/2014 | Kurtz et al. | |
| 2014/0176591 | A1 | 6/2014 | Klein et al. | |
| 2014/0218386 | A1 | 8/2014 | Tatsuno et al. | |
| 2014/0232923 | A1 | 8/2014 | Koh et al. | |
| 2015/0002542 | A1 | 1/2015 | Chan et al. | |
| 2015/0145884 | A1* | 5/2015 | Jang | G01J 3/027 |
| | | | | 345/603 |
| 2015/0350492 | A1 | 12/2015 | Kurtz et al. | |
| 2016/0117993 | A1 | 4/2016 | Buckley et al. | |
| 2016/0370231 | A1 | 12/2016 | Agahian et al. | |
| 2017/0261830 | A1 | 9/2017 | Luten et al. | |
| 2018/0151814 | A1* | 5/2018 | Hirose | H10K 85/30 |
| 2019/0109248 | A1* | 4/2019 | Banerjee | H01L 31/054 |
| 2019/0237008 | A1 | 8/2019 | Ho et al. | |
| 2020/0043201 | A1 | 2/2020 | Tanaka et al. | |
| 2020/0082784 | A1* | 3/2020 | Deng | G06T 11/001 |

FOREIGN PATENT DOCUMENTS

| | | |
|---|---|---|
| JP | 2008109328 A | 5/2008 |
| JP | 2010217645 A | 9/2010 |
| JP | 2012128210 A | 7/2012 |
| JP | 2013225802 A | 10/2013 |
| JP | 2016006408 A | 1/2016 |
| JP | 2017510186 A | 4/2017 |
| WO | 2015186605 A1 | 12/2015 |
| WO | 2017079329 A1 | 5/2017 |
| WO | 2020023675 A1 | 1/2020 |
| WO | 2020028872 A1 | 2/2020 |

OTHER PUBLICATIONS

Application No. CN201980051521.0, "Office Action", [translation is not available], dated Aug. 2, 2022, 9 pages.
U.S. Appl. No. 16/530,877, "Non-Final Office Action", dated Oct. 6, 2020, 37 pages.
PCT/US2019/043309, "International Preliminary Report on Patentability", dated Feb. 4, 2021, 6 pages.
PCT/US2019/043309, "International Search Report and Written Opinion", dated Oct. 18, 2019, 7 pages.
PCT/US2019/044999, "International Preliminary Report on Patentability", dated Feb. 18, 2021, 10 pages.
PCT/US2019/044999, "International Search Report and Written Opinion", dated Oct. 21, 2019, 12 pages.
Ruppertsberg, et al., "Displaying Colourimetrically Calibrated Images on a High Dynamic Range Display", Journal of Visual Communication and Image, vol. 18, Issue 5, Jul. 25, 2007, pp. 429-438.
U.S. Appl. No. 16/530,877, Notice of Allowance, dated Feb. 14, 2022, 11 pages.
U.S. Appl. No. 16/530,877, Final Office Action, dated Oct. 18, 2021, 48 pages.
AU2018234921, "First Examination Report", dated Mar. 11, 2021, 4 pages.
Application No. EP19844175.0, Extended European Search Report, dated Sep. 15, 2021, 9 pages.
Chinese Patent Application No. 201980048485.2, "Office Action", dated Oct. 18, 2023, 8 pages. [no translation available].
Japanese Patent Application No. 2021-505632, "Office Action" and English translation, dated Jul. 25, 2023, 7 pages.
EP19844175.0, "Intention to Grant", dated Dec. 15, 2023, 9 pages.
JP2021-505632, "Office Action", dated Nov. 15, 2023, 5 pages.

* cited by examiner

METHOD AND SYSTEM FOR COLOR CALIBRATION OF AN IMAGING DEVICE

CROSS-REFERENCES TO RELATED APPLICATIONS

This application is a continuation of International Patent Application No. PCT/US2019/043309, filed on Jul. 24, 2019, entitled "METHOD AND SYSTEM FOR COLOR CALIBRATION OF AN IMAGING DEVICE," which claims the benefit of priority to U.S. Provisional Patent Application No. 62/702,809, filed Jul. 24, 2018, entitled "METHOD AND SYSTEM FOR COLOR CALIBRATION OF AN IMAGING DEVICE," the contents of which are hereby incorporated by reference in their entirety for all purposes.

BACKGROUND OF THE INVENTION

Modern computing and display technologies have facilitated the development of systems for so called "virtual reality" or "augmented reality" experiences, wherein digitally reproduced images or portions thereof are presented to a viewer in a manner wherein they seem to be, or may be perceived as, real. A virtual reality (VR) scenario typically involves presentation of digital or virtual image information without transparency to other actual real-world visual input; an augmented reality (AR) scenario typically involves presentation of digital or virtual image information as an augmentation to visualization of the actual world around the viewer.

Despite the progress made in these display technologies, there is a need in the art for improved methods and systems related to augmented reality systems, particularly, display systems.

SUMMARY OF THE INVENTION

Embodiments of the present invention are directed generally to augmented reality systems, particularly, display systems. Some embodiments of the present invention are directed to characterization of a digital camera for use in the calibration of a wearable VR (virtual reality) or AR (augmented reality) device.

According to some embodiments, a method and system are provided for characterizing a digital color camera that is configured to implement a method for utilizing a low-cost industrial color camera for measuring chromaticity and luminance of a virtual image generated by a device having a color display illuminated by narrowband sources such as LED's or lasers and a waveguide type optical element with properties that further narrow and spectrally shift the dominant wavelength (and therefore saturation and hue) of light over the field of view of the virtual image, wherein the waveguide type optical element contains diffractive structures.

According to some embodiments, a method for characterizing a digital color camera includes, for each of three primary colors used in a field sequential color virtual image, illuminating a display device using an input light beam of a primary color having spectral properties representative of a light beam in a virtual image in a wearable device. The method includes capturing, with the digital color camera, an image of the display device. and. The digital color camera is characterized in an RGB (red green blue) color space. The method includes determining, from the image, RGB values for each primary color. The method also includes capturing, with a color-measurement device, a color-measurement value associated with each corresponding primary color at the display device, thereby acquiring a color-measurement value in an absolute color space. The method further includes determining a conversion model for each color using the RGB values and the color-measurement values.

In some embodiments of the above method, the method determines a conversion model for each of red, green, and blue primary colors.

In some embodiments, the method also includes providing the input light beam using a light source and a spectral modification device that provide narrowed and shifted spectral bands representative of the virtual image.

In some embodiments, the light source is an LED, a laser, or a monochromator.

In some embodiments, the spectral modification device can include one or more of a lens system and a filter.

In some embodiments, the method also includes varying spectral content of the input light beam by one or more of the following processes:
  altering power to the input light beam;
  applying pulse-width-modulation (PWM) of the input light beam;
  filtering the light source; and
  combining two or more light sources,
thereby to provide data spanning a range of expected virtual image primary colors.

In some embodiments, the display device is an integrating sphere or a projection screen.

In some embodiments, the color-measurement device is a spectroradiometer or a colorimeter.

In some embodiments, the conversion model for the display device comprises a 3-by-3 matrix.

In some embodiments, the 3-by-3 matrix is calculated using a regression method.

In some embodiments, the color-measurement value in an absolute color space comprises spectrum or XYZ values.

In some embodiments, the color-measurement values are in an absolute color space including one or more of values in CIE XYZ (CIE XYZ color space), CIE xyY (CIE xyY color space), CIELUV (CIE 1976 L*, u*, v* color space), CIELab (CIE L*a*b* color space), or LCh (CIE L*C*h* color space).

In some embodiments, determining a conversion model for each color includes assembling training data from the captured image in the digital color camera's RGB color space and corresponding spectroradiometer measurements in absolute XYZ space, and applying a conversion method to generate the conversion model from converting RGB training data to XYZ training data.

In some embodiments, applying the conversion method includes linear regression, polynomial regression, or neural networks.

In some embodiments, the conversion method further includes applying k-fold cross validation, or leave-one-out cross validation.

According to some embodiments of the present invention, a method is provided for utilizing a color camera, such as a low-cost industrial color camera, for measuring chromaticity and luminance of a virtual image generated by a device that has a field sequential color display illuminated by narrowband sources and a waveguide type optical element for displaying a virtual image over a field of view, the optical element having properties that further narrow and spectrally shift dominant wavelength, saturation, and hue of light over the field of view of the virtual image, wherein the waveguide type optical element includes diffractive structures. The method includes illuminating an integrating sphere or a projection screen with narrowband light sources similar to those utilized in generating the virtual image, and/or similar to narrowed and shifted bands emerging from the virtual image. The method also includes adding dichroic filters, and rotating the dichroic filters, prior to the integrating sphere or the projection screen to mimic bandwidth narrowing and spectrally shifted dominant wavelength of light in the virtual image. The method also includes using the color camera to capture images of the integrating sphere or screen at a conjugate distance close to a virtual image distance, the camera characterized by an RGB color space, and focusing the camera close to a virtual image plane. The method also includes, in parallel, using a spectroradiometer to capture a spectrum and/or CIE XYZ values of light at the integrating sphere or screen, and focusing the spectroradiometer at the integrating sphere or projection screen. The method also includes capturing images (with camera) and spectral data (with spectroradiometer) at separate primaries (red, green, or blue), which are close to primaries expected for field sequential display of the virtual image. The method further includes creating a conversion from the camera's RGB color space to XYZ absolute color space for each virtual image primary color by:

assembling training samples from the captured images and corresponding spectroradiometer measurements in the camera's RGB color space and spectroradiometer's XYZ space;

apply conversion methods, such as linear regression, polynomial regression, or neural networks to generate a transformation from RGB training data to XYZ training data;

applying methods such as k-fold cross validation and leave-one-out cross validation to further optimize robustness and accuracy of the conversion model; and applying the conversion model to the camera for measuring absolute chromaticity and luminance of the virtual images.

In some embodiment of the above method, the narrowband light sources can include LEDs, lasers, or a monochromator.

In some embodiments, the method of also includes converting spectrum or XYZ values to values in an absolute color space, the values in the absolute color space including one or more of values in CIE XYZ (CIE XYZ color space), CIE xyY (CIE xyY color space), CIELUV (CIE 1976 L*, u*, v* color space), CIELab (CIE L*a*b* color space), or LCh (CIE L*C*h* color space).

According to some embodiments, a system for characterizing a digital color camera can include a light source for projecting an image, a spectral modification device, an integrating sphere, a digital color camera, a spectroradiometer, and a processor. The system is configured to use the spectral modification device to modify the light output of the light source to emulate colors in a virtual image of a wearable device. The digital camera can be used to capture RGB (red green blue) values of the image at each pixel for each color, and the spectroradiometer c an be used to determine color-measurement values of the image in an absolute color space, for example, the XYZ data. The system can include a processor, and can be configured to determine a conversion model between RGB values of the image captured by the digital color camera and the color-measurement values of the image in the absolute color space determined by the spectroradiometer for each of three primary colors used in a field sequential color virtual image.

In some embodiments, the system is configured to provide an input light beam using the light source and the spectral modification device that provide narrowed and shifted spectral bands representative of the field sequential color virtual image.

In some embodiments, the light source is an LED (light emitting diode), a laser, or a monochromator.

In some embodiments, the spectral modification device can include one or more of a lens system and a filter.

In some embodiments, the conversion model comprises a 3-by-3 matrix.

In some embodiments, the 3-by-3 matrix is calculated using a regression method.

In some embodiments, the color-measurement value in an absolute color space comprises spectrum or XYZ values.

In some embodiments, the color-measurement value in an absolute color space comprises values in CIE XYZ (CIE XYZ color space), CIE xyY (CIE xyY color space), CIELUV (CIE 1976 L*, u*, v* color space), CIELab (CIE L*a*b* color space), or LCh (CIE L*C*h* color space).

In some embodiments, the system is configured to determine the conversion model for each color by assembling training data from captured images from the digital color and corresponding spectroradiometer measurements in the absolute color space, and applying a conversion method to generate the conversion model from converting RGB training data to XYZ training data.

In some embodiments, the system is configured to apply the conversion method by using linear regression, polynomial regression, or neural networks.

In some embodiments, the system is configured to apply the conversion method by applying k-fold cross validation, or leave-one-out cross validation.

Numerous benefits are achieved by way of the present invention over conventional techniques. For example, embodiments of the present invention provide methods and systems for using a low-cost digital color camera to calibrate a wearable display device. In a conventional setting, a spectroradiometer can be used to measure the displayed image light of a display device and determine the output color in an absolute color space, such as the CIE XYZ color space. However, spectroradiometers are too bulky and expensive to be used in large quantities in a production environment for the calibration of a large number of wearable display devices. Moreover, some conventional methods only calibrate the white color using a white light input. Therefore, conventional systems and methods are not suitable for the calibration of wearable devices using field sequential color displays. Embodiments of the present invention provide methods and systems for determining a conversion model from the digital camera specific RGB color space to the CIE XYZ color space. The conversion model can then be applied to digital color cameras for measuring absolute chromaticity and luminance of the virtual images. The calibrated low-cost digital cameras can be used in large quantities in a production environment for the calibration of a large number of wearable display devices.

These and other embodiments of the invention along with many of its advantages and features are described in more detail in conjunction with the text below and attached figures.

DETAILED DESCRIPTION OF THE INVENTION

Embodiments of the present invention are directed characterization of a digital camera for use in the calibration of a wearable display device.

The color displayed by a wearable device can be non-uniform. For example, in a wearable device that includes a waveguide display, the optical components can narrow the color spectrum and shift the color spectrum. Further, color shifts can occur from the user's temple side to the nasal side. Color variations can also be caused by other reasons. Therefore, it is desirable to apply pixel by pixel calibration and correction to obtain a uniform output color over the field of view.

Figure 1:
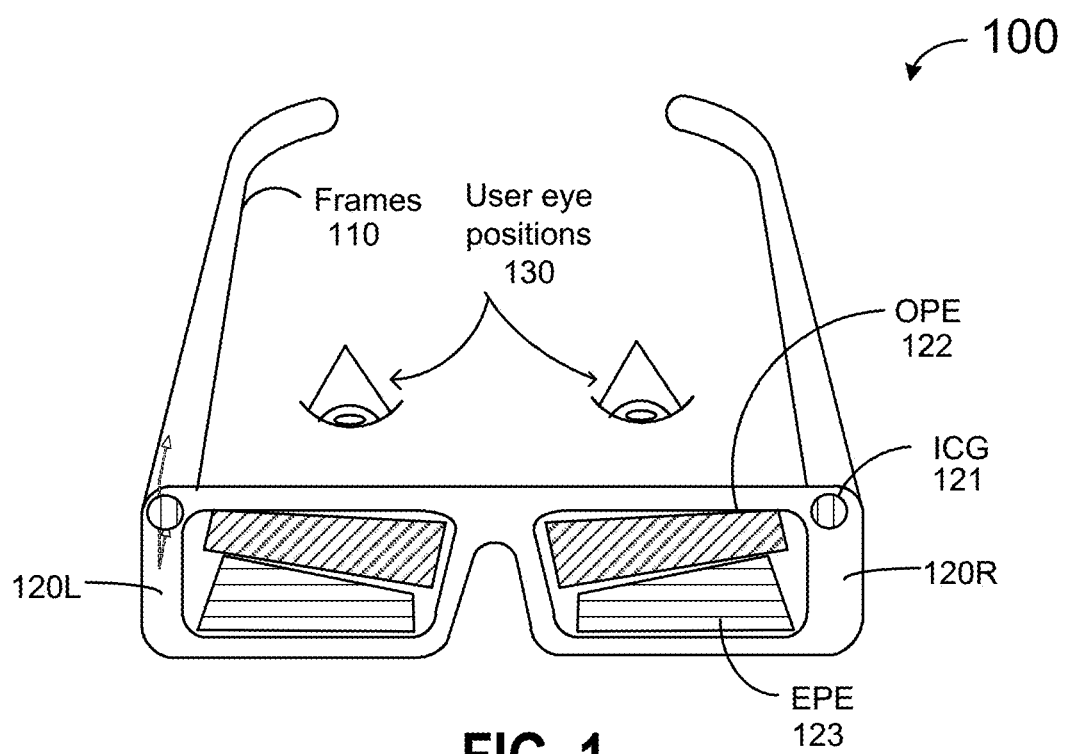
FIG. 1 is a perspective view of an exemplary wearable display device according to some embodiments.

FIG. 1 is a perspective view of an exemplary wearable display device 100 according to some embodiments. In this example, wearable display device 100 can be a pair of augmented reality glasses. As shown in FIG. 1, wearable display device 100 can include frames 110 supporting a left waveguide eyepiece 120L and a right waveguide eyepiece 120R. Each waveguide eyepiece 120L and 120R can include an input coupling grating (ICG) 121, an orthogonal pupil expander (OPE) 122, and an exit pupil expander (EPE) 123. The input coupling grating is also referred to as the input coupling port. The input coupling grating (ICG) 121, orthogonal pupil expander (OPE) 122, and exit pupil expander (EPE) 123 can be suitable diffractive optical elements (DOEs). For example, they can take the form of gratings formed on an optical waveguide. According to certain embodiments, rather than providing a single waveguide for each eyepiece, each eyepiece can have a stack of multiple optical waveguides, for different colors and with different optical power EPEs. The EPEs are configured to project images that can be viewed from the user eye positions 130.

In FIG. 1, incoming light, which can be image light or a scanning light beam, can incident upon the ICG (121) of each eyepiece 120L, 120R. Each ICG 121 couples the incoming light into guided mode propagating in a direction toward the OPE region 122. The eyepiece propagates the image light by total internal reflection (TIR). The OPE region 122 of each eyepiece 120L, 120R can also include a diffractive element that couples and redirects a portion of the image light propagating in the eyepiece 120L, 120R toward the EPE region 123. The EPE region 123 includes a diffractive element that couples and directs a portion of the light propagating in each eyepiece 120L, 120R in a direction outward from the plane of the eyepiece layer 120 toward viewer's eye positions 130. In this fashion, an image may be viewed by the viewer.

The incoming light may include light in the three primary colors, namely blue (B), green (G), and red (R).

In some applications, the eyepiece can accept collimated light which is scanned in two degrees of freedom. Each instantaneous angle of incidence (or small range of angle of incidence) corresponds to an angularly defined pixel. In some embodiments, the light can be configured to simulate a virtual object, which can appear to be some distance, e.g., half a meter to a meter, away from the viewer.

Figure 2:
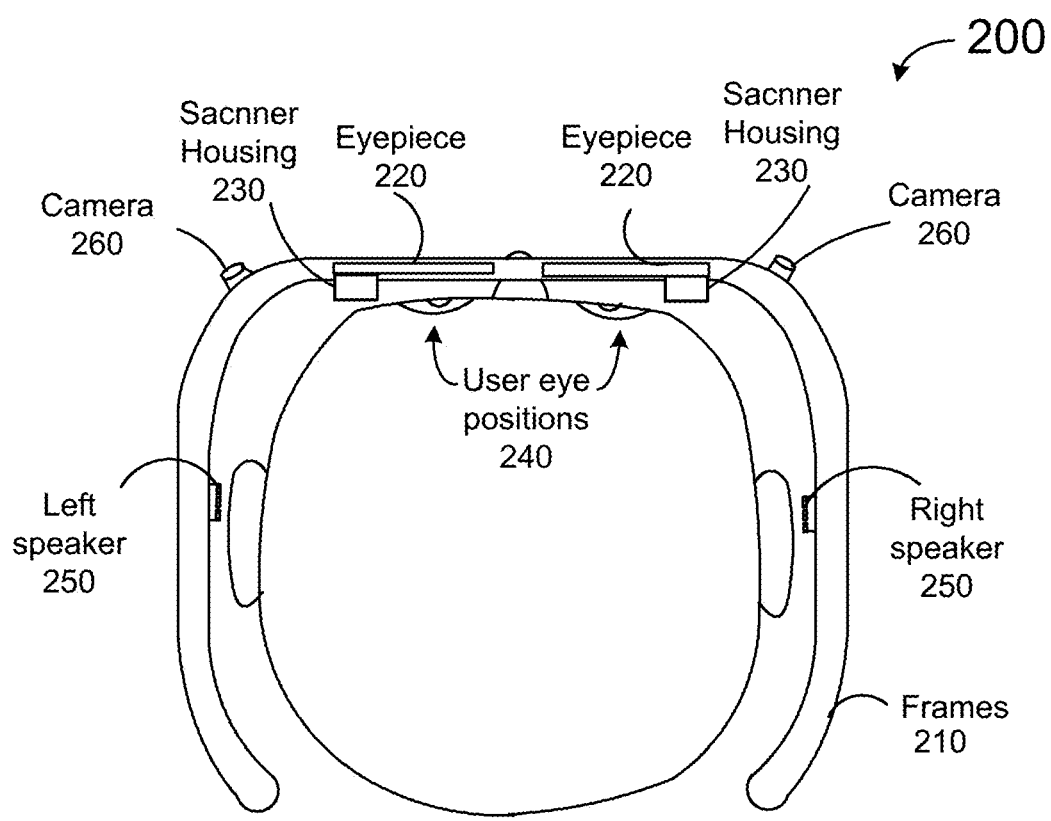
FIG. 2 is a top view of an exemplary wearable display device according to some embodiments.

FIG. 2 is a top view of an exemplary wearable display device 200 according to some embodiments. In this example, wearable display device 200 can be used as a pair of augmented reality glasses. As shown in FIG. 2, wearable display device 200 can include frames 210 and eyepieces 220. Each eyepiece can be similar to eyepieces 120L, 120R in FIG. 1 and can include an ICG, an OPE, and an EPE, which are not visible in the top view. Wearable display device 200 can also include scanner housings 230, which can include a scanning mirror for forming a virtual image (e.g., at infinity) from incoming light sources. In some embodiments, the ICGs are used as input ports for receiving light. The images formed by the eyepiece can be viewed from user eye positions 240. The wearable display device can also have left and right speakers 250 and cameras 260.

As described above, the incoming light may include light in the three primary colors, namely blue (B), green (G), and red (R). In some embodiments, the light beams in the incoming light are combined in an optical combiner. For a wearable device for VR and AR applications, it is desirable that the optical combiners in the system are compact and light weight.

Figure 3:
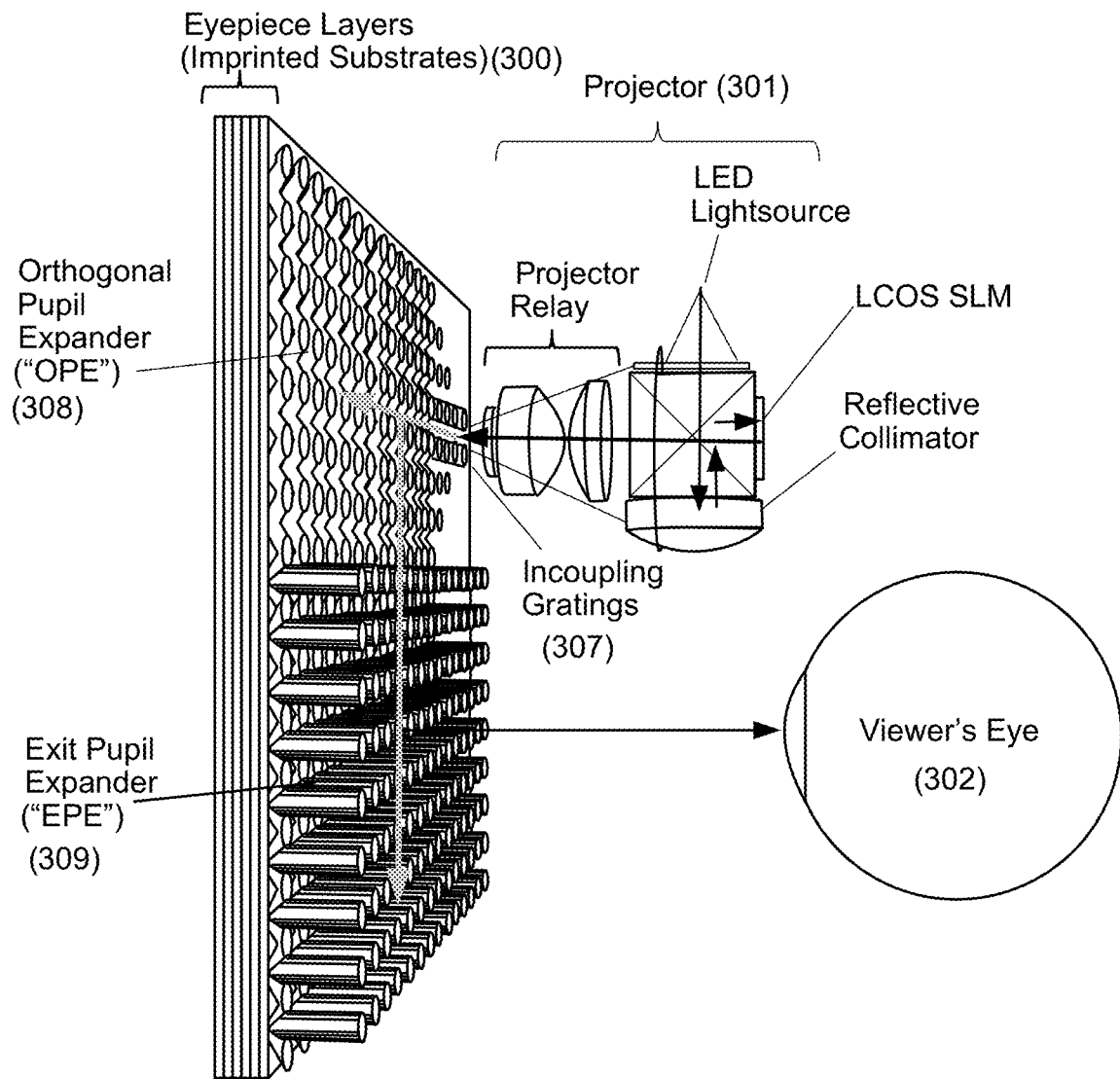
FIG. 3 is a schematic diagram illustrating the light paths in a viewing optics assembly (VOA) that may be used to present a digital or virtual image to a viewer according to some embodiments of the present invention.

FIG. 3 illustrates schematically the light paths in a viewing optics assembly (VOA) that may be used to present a digital or virtual image to a viewer, according to some embodiments of the present invention. The VOA includes a projector 301 and an eyepiece 300 that may be worn around a viewer's eye. In some embodiments, the projector 301 may include a group of red LEDs, a group of green LEDs, and a group of blue LEDs. For example, the projector 301 may include two red LEDs, two green LEDs, and two blue LEDs according to an embodiment. The eyepiece 300 may include one or more eyepiece layers. Projector 301 can also include an LCOS-SLM (Liquid Crystal on Silicon-Spatial Light Modulator), and various optical elements such as a reflective collimator and a projector relay. In one embodiment, the eyepiece 300 includes three eyepiece layers, one eyepiece layer for each of the three primary colors, red, green, and blue. In another embodiment, the eyepiece 300 may include six eyepiece layers, i.e., one set of eyepiece layers for each of the three primary colors configured for forming a virtual image at one depth plane, and another set of eyepiece layers for each of the three primary colors configured for forming a virtual image at another depth plane. In other embodiments, the eyepiece 300 may include three or more eyepiece layers for each of the three primary colors for three or more different depth planes. Each eyepiece layer comprises a planar waveguide layer and may include an incoupling grating 307, an orthogonal pupil expander (OPE) region 308, and an exit pupil expander (EPE) region 309.

Still referring to FIG. 3, the projector 301 projects image light onto the incoupling grating 307 in an eyepiece layer 300. The incoupling grating 307 couples the image light from the projector 301 into the planar waveguide layer propagating in a direction toward the OPE region 308. The waveguide layer propagates the image light in the horizontal direction by total internal reflection (TIR). The OPE region 308 of the eyepiece layer 300 also includes a diffractive element that couples and redirects a portion of the image light propagating in the waveguide layer toward the EPE region 309. The EPE region 309 includes an diffractive element that couples and directs a portion of the image light propagating in the waveguide layer in a direction approximately perpendicular to the plane of the eyepiece layer 300 toward a viewer's eye 302. In this fashion, an image projected by projector 301 may be viewed by the viewer's eye 302.

As described above, image light generated by the projector may include light in the three primary colors, namely blue (B), green (G), and red (R). Such image light can be separated into the constituent colors, so that image light in each constituent color may be coupled to a respective waveguide layer in the eyepiece.

In some embodiments, the color displayed by a wearable device can be calibrated by measuring the wearable device output with an eye-proxy camera at the eye position and compared with target display values. The measurement can be carried out at a larger FOV (field of view), and can be close to the full FOV of the camera. Digital color cameras measure color in RGB space. To represent human perception of the color, data in the camera's RGB space can be transformed from the camera's RGB space to the eye's XYZ space or other absolute color space, e.g., as defined in the CIE 1931 color space. Once the output of the wearable device can be described in the absolute color space, adjustments can be applied to the colors to obtain the desired virtual image, for example, a uniform white color over the entire image.

The images taken by a digital color camera are encoded intrinsically the camera or the camera manufacturer. As an example, the RGB space data measured using a particular camera can vary from camera to camera, and from manufacturer to manufacturer. Furthermore, the camera manufacturers can differ in the way the RGB space is defined, the algorithms used, and the color filters used in the camera, etc. Therefore, there is a need to characterize the digital color camera, so that low-cost cameras can be used reliably to make color measurements in an industrial or production environment. Once the camera is characterized, the camera's RGB data can then be converted to XYZ space for use in color calibration.

Figure 4A:
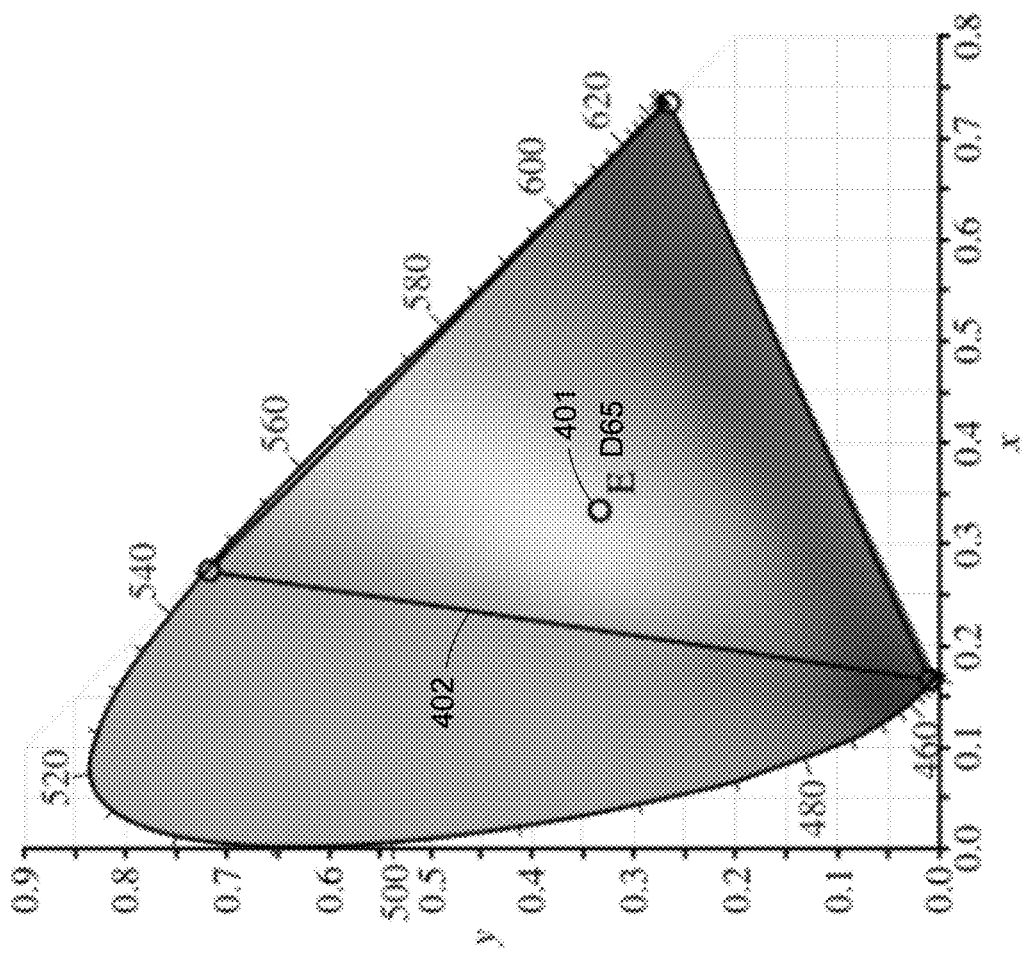
FIG. 4A is diagram illustrating the CIE 1931 color space chromaticity diagram.

FIG. 4A is diagram illustrating the CIE 1931 color space chromaticity diagram. The CIE XYZ color space encompasses all color sensations that are visible to a person with average eyesight. The CIE XYZ (Tristimulus values) is a device-invariant representation of color. It serves as a standard reference against which many other color spaces are defined. In FIG. 4A, point E (401) denoted D65 (or CIE Standard Illuminant D65) is a commonly used standard illuminant defined by the International Commission on Illumination (CIE). It is used to portray standard illumination conditions at open-air in different parts of the world. FIG. 4A also illustrates the sRGB color space 402. The sRGB (standard Red Green Blue) color space is an RGB color space that Hewlett-Packard and Microsoft created cooperatively in 1996 to use on monitors, printers, and the Internet. It was subsequently standardized and is often the "default" color space for images.

Figure 4B:
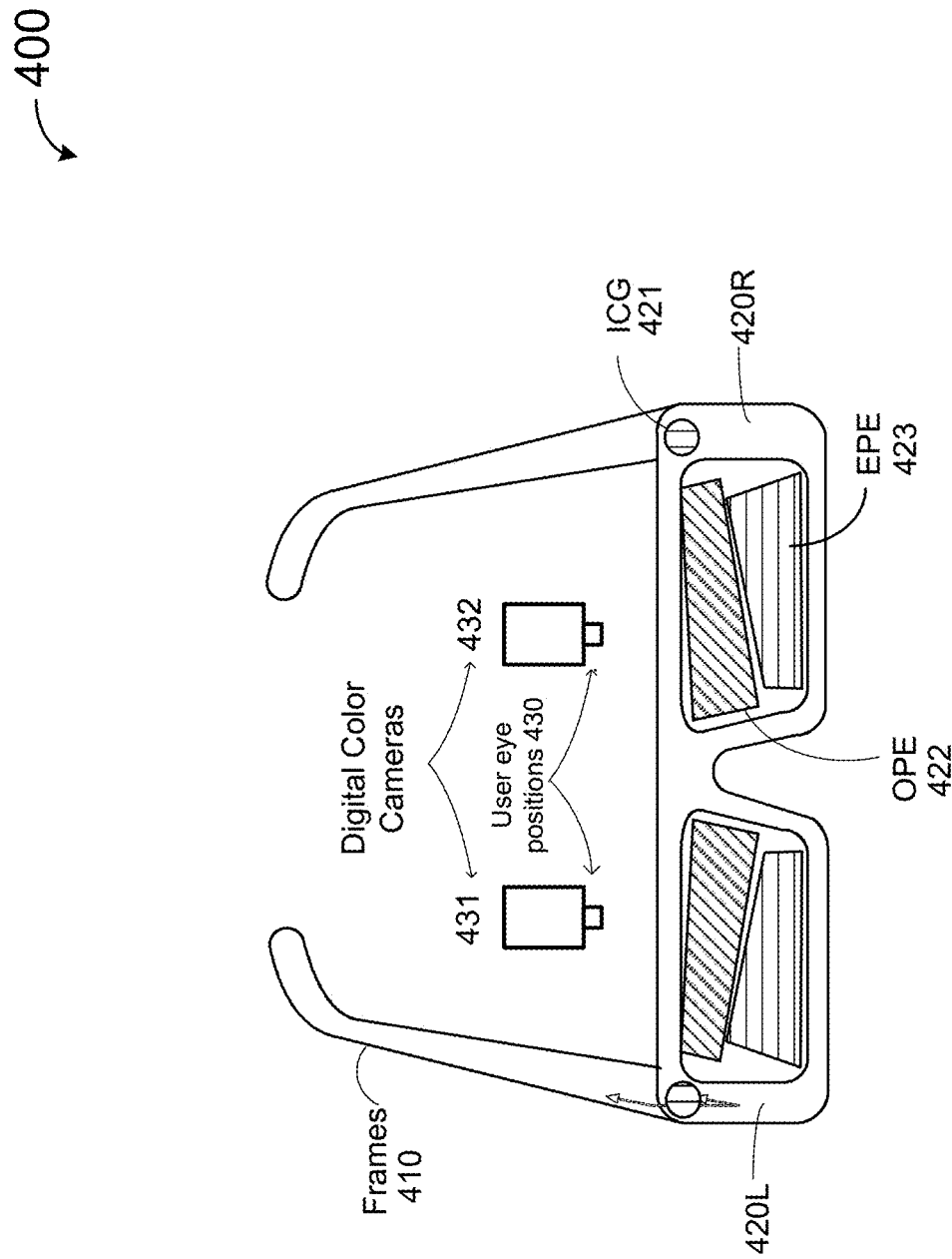
FIG. 4B is a simplified schematic diagram illustrating a method for calibrating a wearable device according to some embodiments of the present invention.

FIG. 4B is a simplified schematic diagram illustrating a method for calibrating a wearable display device according to some embodiments of the present invention. In FIG. 4B, a wearable display device 400 is similar to the exemplary wearable display device 100 illustrated above in FIG. 1. In this example, wearable display device 400 can be a pair of glasses for augmented reality applications. As shown in FIG. 4, wearable display device 400 can include frames 410 supporting a left waveguide eyepiece 420L and a right waveguide eyepiece 420R. Each waveguide eyepiece 420L and 420R can include an input coupling grating (ICG) 421, an orthogonal pupil expander (OPE) 422, and an exit pupil expander (EPE) 423. The input coupling grating is also referred to as the input coupling port. The input coupling grating (ICG) 421, orthogonal pupil expander (OPE) 422, and exit pupil expander (EPE) 423 can be suitable diffractive optical elements (DOEs). For example, they can take the form of gratings formed on optical waveguides. Each eyepiece can have a stack of multiple optical waveguides, for different colors and with different optical power EPEs. The EPEs are configured to project images that can be viewed from the user eye positions 430.

In embodiments of the invention, for the calibration of the wearable display device 400, digital color cameras 431 and 432 are disposed or positioned at the user eye positions 430, that is, positioned where the users' eyes would be located during use of the wearable device. In some embodiments, a spectroradiometer can be used to measure the displayed image light of a display device and determine the output color in an absolute color space, such as the CIE XYZ color space. However, spectroradiometers are often too bulky for the measurement of a wearable device as shown in FIG. 4B. Further, spectroradiometers are also expensive, limiting their use in large quantities in a production environment for the calibration of a large number of wearable display devices. Moreover, some methods only calibrate the white color using a white light input. Therefore, conventional systems and methods are not suitable for the calibration of wearable devices using field sequential color displays.

Accordingly, in embodiments of the invention, the color displayed by a wearable display device is calibrated by measuring the wearable output with low-cost digital color cameras, also referred to as eye-proxy cameras, that are located at the eye positions. Accordingly eye-proxy cameras are used as a color-measurement device that can be implemented in a high-volume production environment. Digital color cameras provide the color measurements in RGB space. To represent human perception of the color, data in the camera's RGB space is transformed from the camera's RGB space to the eye's XYZ space, e.g., as defined in CIE 1931 color space. Once the output of the wearable device is described in the absolute color space, adjustments can be applied to the colors to obtain the desired virtual image. For example, a desired virtual image may be a uniform white color over the entire image.

Figure 5:
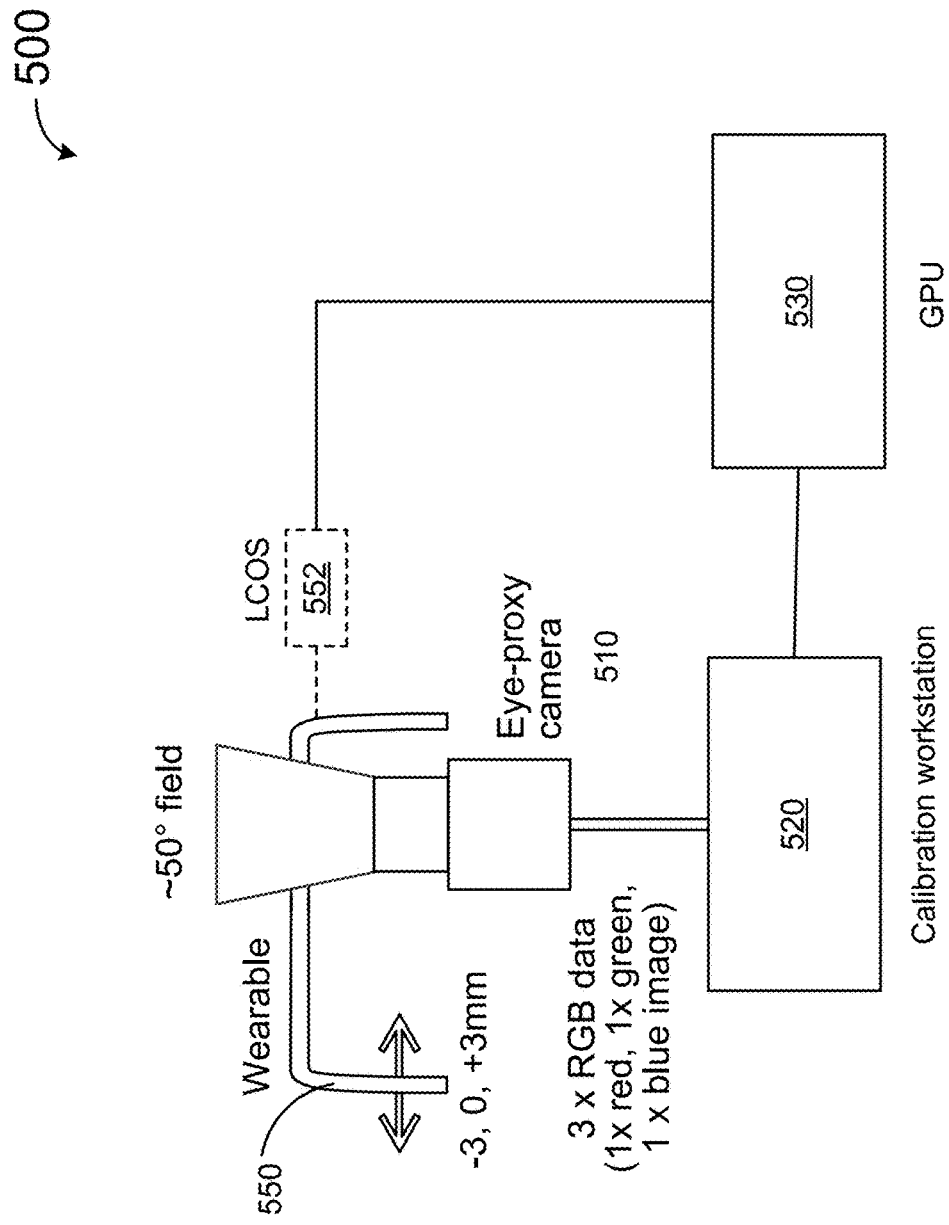
FIG. 5 is a simplified schematic diagram illustrating a system for calibrating a wearable device according to some embodiments of the present invention.

FIG. 5 is a simplified schematic diagram illustrating a system for calibrating a wearable device according to some embodiments of the present invention. As shown in FIG. 5, the calibration system is implemented in terms of measuring one side of the wearable device, which is associated with one eye. The extension of the system to the testing of the second eye will be evident to one of skill in the art. The calibration system 500 can include an eye-proxy camera 510, a calibration workstation 520, and a graphic processing unit 530. Calibration workstation 520 is also referred to as the first processor, and graphic processing unit 530 (GPU) is also referred to as a second processor. In some embodiments, the first and second processors can be part of the same computer system.

The eye-proxy camera 510 can be a digital color camera. For example, low-cost, small commercial and industrial color cameras can be used. During calibration, the camera can be installed adjacent to a wearable device in a station. Two cameras can be used side by side to measure the wearable device's display output for the left and right eyes concurrently or simultaneously, as illustrated in FIG. 4B. To simplify the illustration, as shown in FIG. 5, only one camera 510 is shown positioned at a conjugate distance from a wearable device 550. The position of the wearable device 550 can be shifted to different positions relative to the camera to account for possible color shift with changes in eye position, inter-pupil distance, and movement of the user, etc. Merely as an example, the wearable device 550 is shown to be shifted in three lateral locations, at −3, 0, and +3 mm. In addition, the relative angles of the wearable device with respect to the camera can also be varied to provide additional calibration conditions.

The wearable device 550 can include one or more light sources (also referred to as image light sources) such LEDs or lasers. In some embodiments, an LCOS (Liquid Crystal on Silicon) can be used to provide the display images. The LCOS is built into the wearable device 550. However, in FIG. 5, an LCOS 552 is shown outside the wearable device 550 for illustration purposes. During calibration, image light is projected by the wearable device 550 in field sequential color, for example, in the sequence of red image, green image, blue image. In a field-sequential color system, the primary color information is transmitted in successive images, which relies on the human visual system to fuse the successive images into a color picture. The eye-proxy camera 510 captures the images in each pixel in the camera's RGB color space and provides the data to the calibration workstation 520.

The Calibration workstation 520 is configured to convert the image data in the camera's RGB space to the XYZ color space, and compare the data with the expected data based on the instruction, e.g., from a content provider, to the wearable device 550. The calibration workstation 520 is also configured to determine a correction factor based on the discrepancies between measured values and the intended values. The graphic processing unit 530 is configured to apply the correction factor to the instruction and send the revised instruction to the light sources of the wearable device.

In some embodiments, the calibration can be done for multiple depth planes of the wearable device and for different portions of the field of view of the wearable device. For example, in a uniformity calibration, this process can be performed separately for each of four virtual images (left near, left far, right near, right far), and then the XYZ information can be used to balance those images to be as close as possible to the same color (chromaticity) and brightness (luminance) or within predetermined thresholds as appropriate to the particular application.

Figure 6:
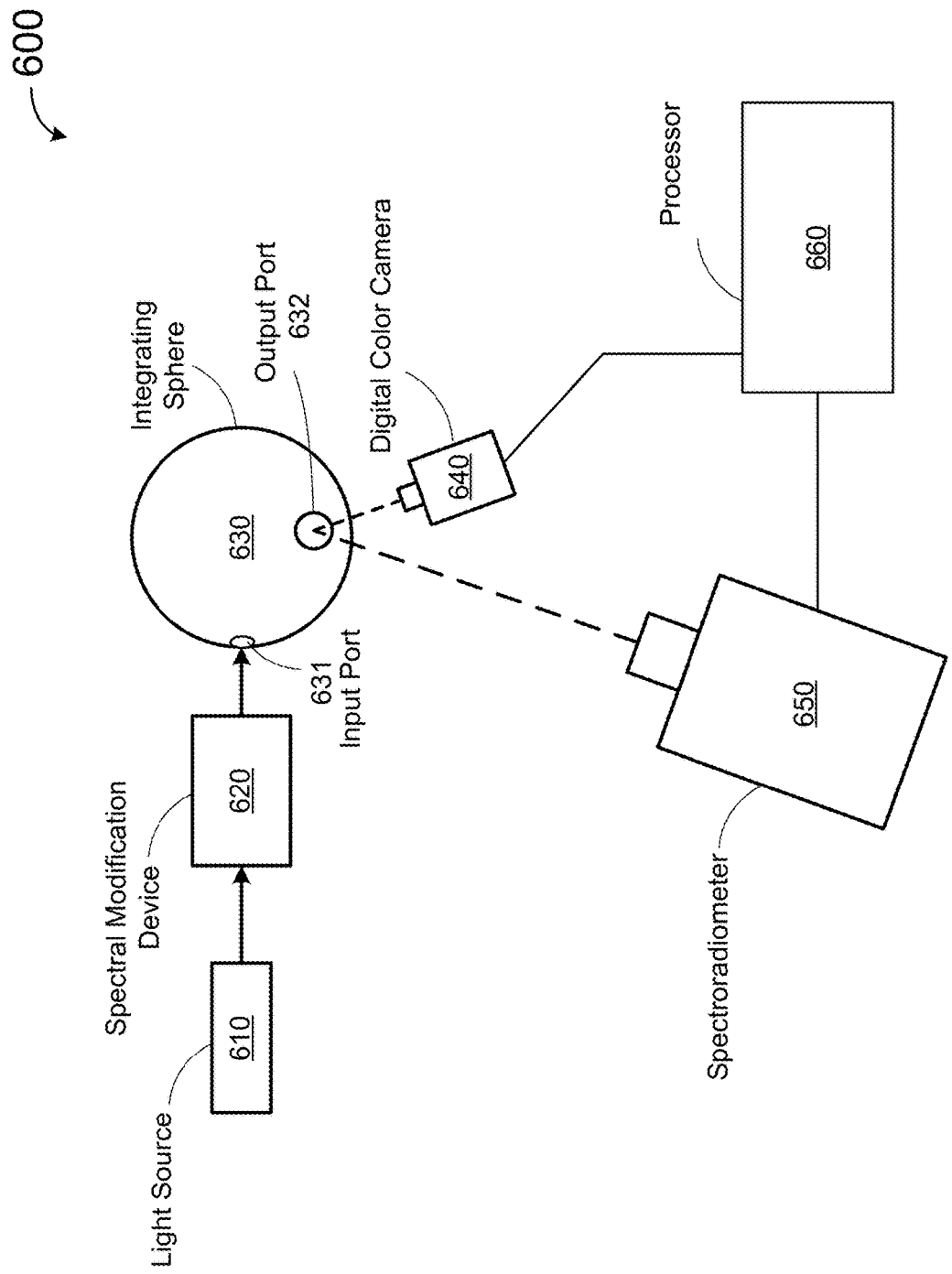
FIG. 6 is a simplified block diagram illustrating a system for characterizing a digital color camera according to some embodiments of the present invention.

FIG. 6 is a simplified block diagram illustrating a system for characterizing a digital color camera. As shown in FIG. 6, system 600 can include a light source 610, a spectral modification device 620, an integrating sphere 630, a digital color camera 640, a spectroradiometer 650, and a processor 660. The integrating sphere 630 is an example of a display device, and other kinds of display devices can also be used. The spectroradiometer 650 is an example of a color-measurement device, and other types of color-measurement device can be used instead of the spectroradiometer 650. System 600 is configured to determine a conversion model between each displayed color captured by the digital color camera RGB values and the color-measurement values in an absolute color space, e.g., XYZ values. The conversion model includes conversion matrices or equations for each of three primary colors used in a field sequential color virtual image.

Light source 610 and spectral modification device 620 are configured to illuminate the integrating sphere 630 with an input light beam of a primary color having spectral properties representative of a light beam in a virtual image in a wearable device. The digital color camera 640 captures an image of the display device and determines from the image RGB values for the primary color. The spectroradiometer 650 determines a color-measurement value, e.g., XYZ values, associated with each corresponding primary color at the display device, thereby acquiring a color-measurement value in an absolute color space. The processor 660 is configured to determine a conversion model for each primary color using RGB values and the color-measurement values determined from training samples representing different illumination conditions.

In FIG. 6, light source 610 can include LEDs or lasers for generating light beams of primary colors. Alternatively, light beams of the primary colors can be generated from a monochromator, which includes a white light source that can be filtered to provide different light colors. In some embodiments, the LEDs can be configured to emit light at different brightness levels, or grey levels. In an embodiment, the LEDs are configured at the highest grey level, 255, in a scale from 0-255. In order to characterize the digital color camera at different operating conditions, a broad set of training samples with spectral diversity can be generated by using different LEDs. For example, LED's from different bins of dies can be selected. Further, the light source 610 can include a controller that can vary the emission power of the LEDs, for example, at LED current levels of 10 mA, 50 mA, or 100 mA, etc., that can change the temperature of the LEDs. The controller can also modulate the LEDs with pulse width modulation (PWM) at various duty cycles, e.g., from 0 to 1.0. The PWM pulsing can change the thermal characteristic of the LEDs. Moreover, to add variety, outliner training samples can be generated by a combination of LEDs of different colors. For example, a training sample of a modified red color can be obtained with red light mixed with a small amount of green and blue. The color mixing can be achieved by PWM control, for example, with 1.0 PWM duty cycle for green and 0.05-0.2 PWM duty cycle for red and blue. As described further below, adding extra colors to a primary color can improve the stability of the computation process to determine the conversion matrix. Additional varieties of training samples can be obtained by leaving out a portion of a training set for a regression procedure, and leaving out a different portion for another regression procedure.

As described above, the wearable device includes various optical components, such as the waveguide and diffractive components. These optical components can modify the light beam spectrum. In order to provide input light beams that can emulate the output light in the wearable device, the spectrum properties of the wearable device is characterized. The spectral modification device 620 is configured to receive light beams from light source 610 and generate a light beam that is representative of the spectrum of light in a virtual image of the wearable device. For example, the spectral modification device 620 can change the center emission wavelength and the bandwidth of the input light beam. Depending on the embodiments, the spectral modification device 620 can include lens systems, filters, and diffusers. For example, dichroic filters can be used to further narrow LED spectrum and increase saturation. Further, filters can be used to narrow the bandwidth of different colors. In some cases, rotating dichroic filters can be used to tune spectral wavelength to better mimic the wearable output, for example, with the filter positioned at different tilt angles for different colors.

In FIG. 6, the integrating sphere 630 is an example of a display device. Alternatively, other display devices, such as a projection screen can also be used. An integrating sphere is an optical component consisting of a hollow spherical cavity with its interior covered with a diffuse white reflective coating, with small holes for input and output ports. Its relevant property is a uniform scattering or diffusing effect. An integrating sphere may be thought of as a diffuser which preserves power but destroys spatial information. As shown in FIG. 6, system 600 uses an integrating sphere 630 as the display device. The integrating sphere can have an input port 631 for receiving the light beam from the spectral modification device 620, and an output port 632 to provide output light for measurement by digital color camera 640 and spectroradiometer 650. Alternatively, a projection screen can also be used as the display device.

The digital color camera 640 captures digital images in an array of N by M pixels. In a specific embodiment, the digital color camera 640 can have 1400 by 960 pixels. Color information in pixel is represented in the camera's RGB color space. For example, when a red light is emitted from the light source 610, the sensors in the digital camera 640 can sense light at the integrating sphere and can capture values of red, green, blue colors (Rr, Gr, Br) in each pixel. Similarly, for an input of green color, RGB data (Rg, Gg, Bg) is captured for each pixel. Further, for a input of blue color, RGB data (Rb, Gb, Bb) is captured for each pixel.

In parallel to the digital camera 640 sensing light output at the integrating sphere, the spectroradiometer 650 also senses the light at the integrating sphere. The spectroradiometer 650 can capture spectrum and/or CIE XYZ values of the light at the integrating sphere. In some embodiments, the spectroradiometer 650 can measure the xyY values and derive the CIE XYZ values. The spectroradiometer 650 can also convert the spectrum or XYZ values to CIE XYZ (CIE XYZ color space), CIE xyY (CIE xyY color space), CIE-LUV (CIE 1976 L*, u*, v* color space), CIELab (CIE L*a*b* color space), or LCh (CIE L*C*h* color space), or some other appropriate absolute color space. In alternative embodiments, the conversion can also be performed by the processor 660.

In system 600, the processor 660 is configured to assemble training samples from the captured images in the camera's RGB space and corresponding spectroradiometer measurement values in the XYZ space of the spectroradiometer. The processor 660 is coupled to spectroradiometer 650 and digital camera 640 through wired or wireless connections. As described further below, a diverse set of training samples can be gathered by varying the light source and spectrum. The processor 660 then applies conversion methods to generate a transformation model from RGB training data to XYZ training data. Various conversion methods can be used, such as least square, linear regression, polynomial regression, or neural networks, etc. In addition, methods such as k-fold cross validation and leave-one-out cross validation can also be used to further optimize conversion robustness and accuracy.

For example, in a training sample for the red color, the camera captures the image in the camera's RGB space in the form of (Rr, Gr, Br) representing the red, green, and blue light sensed by the camera. Depending on the embodiments, the RGB data from all pixels of the camera, or a subset of the pixels, can be included in the training set. In some embodiments, for each image, the RGB value over all the pixels is used, since the output from the integrating sphere is substantially uniform. The corresponding spectroradiometer measurement in the form of (Xr, Yr, Zr) in the XYZ space for the red, green, and blue light components are generated by the spectroradiometer 650. A conversion matrix Mred can be derived by processor 660 for the training samples for the red color with the following property, $$[M_{red}] \times \begin{bmatrix} R_r \\ G_r \\ B_r \end{bmatrix} + \begin{bmatrix} k_{r1} \\ k_{r2} \\ k_{r3} \end{bmatrix} = \begin{bmatrix} X_r \\ Y_r \\ Z_r \end{bmatrix}$$

where kr1, kr2, and kr3 are optional optimization parameters for the red color.

Similar procedures can be carried out for each of the primary colors. For example, a conversion matrix Mgrn is derived for the training samples for the green color such that, $$[M_{grn}] \times \begin{bmatrix} R_g \\ G_g \\ B_g \end{bmatrix} + \begin{bmatrix} k_{g1} \\ k_{g2} \\ k_{g3} \end{bmatrix} = \begin{bmatrix} X_g \\ Y_g \\ Z_g \end{bmatrix}$$

where kg1, kg2, and kg3 are optional optimization parameters for the green color.

Similarly, a conversion matrix Mblu is derived for the training samples for the blue color such that, $$[M_{blu}] \times \begin{bmatrix} R_b \\ G_b \\ B_b \end{bmatrix} + \begin{bmatrix} k_{b1} \\ k_{b2} \\ k_{b3} \end{bmatrix} = \begin{bmatrix} X_b \\ Y_b \\ Z_b \end{bmatrix}$$

where kb1, kb2, and kb3 are optional optimization parameters for the blue color.

The RGB to XYZ conversion matrices described above can then be used in the wearable device calibration system 500 described in connection to FIG. 5.

As described above, system 600 for characterizing a digital color camera is configured to implement a method for utilizing a low-cost industrial color camera for measuring chromaticity and luminance of a virtual image generated by a device having a field sequential color display illuminated by narrowband sources such as LED's or lasers and a waveguide type optical element with properties that further narrow and spectrally shift the dominant wavelength (and, therefore, saturation and hue) of light over the field of view of the virtual image, wherein the waveguide type optical element contains diffractive structures.

The method includes illuminating an integrating sphere or a projection screen with narrowband light sources similar to those utilized in generating the virtual image, and/or similar to narrowed and shifted bands emerging from the virtual image. In system 600 of FIG. 6, this process can be carried out by light source 610 and integrating sphere 630. The narrowband light sources can include LED's, lasers, or a monochromator.

The method also can include adding dichroic filters, and rotating the dichroic filters, prior to the integrating sphere or the projection screen to better mimic the bandwidth narrowing and spectrally shifted dominant wavelength of light in the virtual image. Variations in the primary color spectral content can be increased by one or more of altering power to the sources, applying pulse-width-modulation of the sources, filtering the sources, or combining two or more sources to provide data spanning the range of expected virtual image primaries. In system 600 of FIG. 6, this process can be carried out by the light source 610 and the spectral modification device 620.

A camera can be used to capture images of the integrating sphere or screen at a conjugate distance close to the virtual image distance, focusing the camera lens close to the virtual image plane. In system 600 of FIG. 6, this process can be carried out by digital color camera 640. In parallel, a spectroradiometer can be used to capture a spectrum and/or CIE XYZ values of light at the integrating sphere or screen; focusing the spectroradiometer at the integrating sphere or projection screen. The spectrum or XYZ values can also be converted to CIE XYZ, CIE xyY, CIELUV, CIELab, or LCh, or some other appropriate absolute color space. In system 600 of FIG. 6, this process can be carried out by spectroradiometer 650.

The method also includes capturing images (with camera) and spectral data (with spectroradiometer) at separate primaries (red, green, or blue), which are close to the primaries expected for field sequential display of the virtual image.

The method further includes creating a conversion from the camera's RGB color space to XYZ absolute color space for each virtual image primary by assembling training samples from the captured images and corresponding spectroradiometer measurements in the camera's RGB space and spectroradiometer's XYZ space, and applying conversion methods, such as linear regression, polynomial regression, or neural networks to generate a transformation from RGB training data to XYZ training data. Optionally, the method can also include applying methods such as k-fold cross validation and leave-one-out cross validation to further optimize conversion robustness and accuracy. In system 600 of FIG. 6, this process can be carried out by the processor 660.

The conversion can be applied to an individual camera, or to a set of similar cameras, for measuring absolute chromaticity and luminance of the virtual images.

Figure 7:
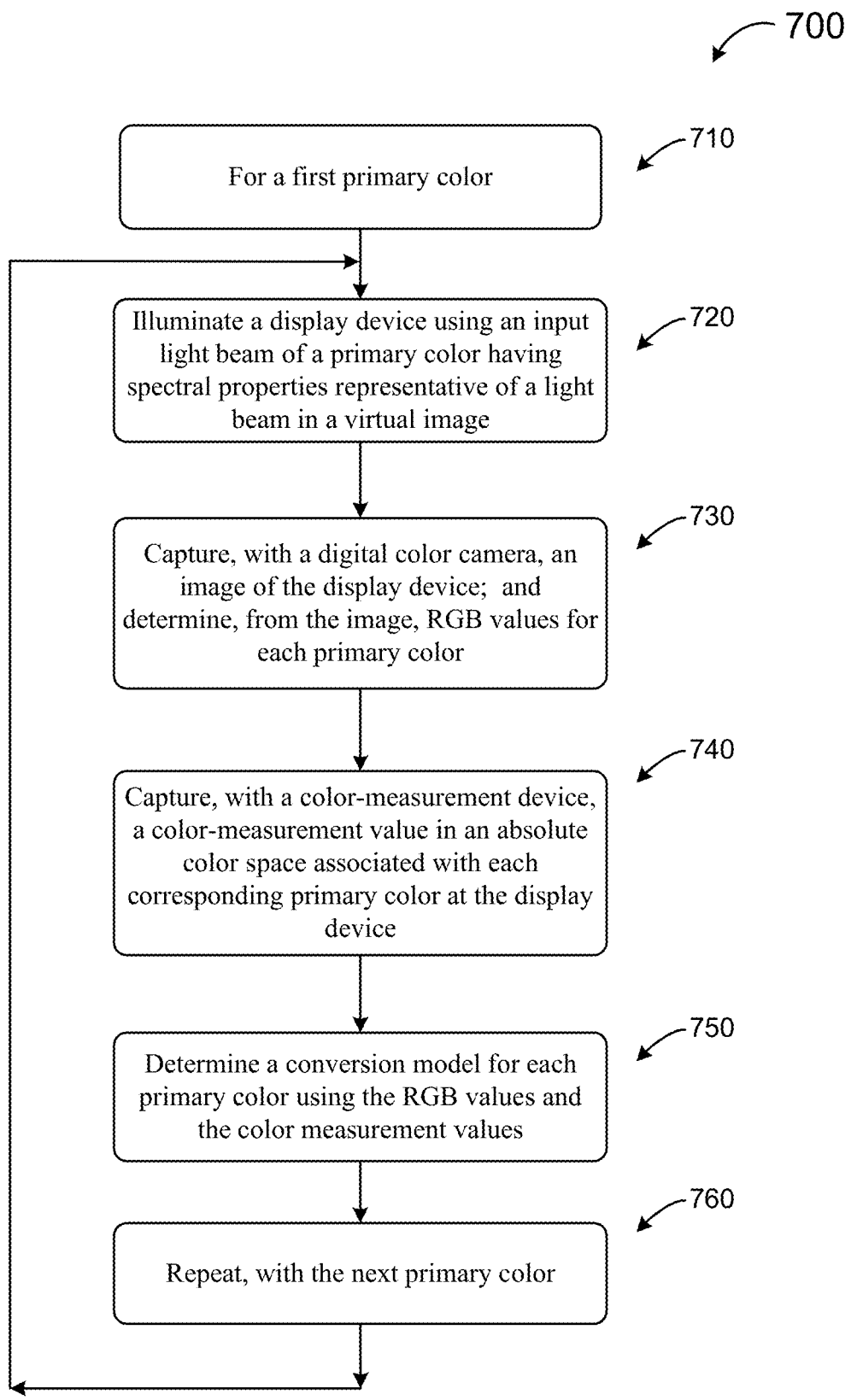
FIG. 7 is a simplified flowchart illustrating a method for characterizing a digital color camera according to some embodiments of the present invention.

FIG. 7 is a simplified flowchart illustrating a method for characterizing a digital color camera according to some embodiments of the present invention. The digital color camera can be used in the calibration of a field-sequential color wearable device that displays a virtual image. As shown in FIG. 7, method 700 includes, for each of three primary colors used in a field sequential color virtual image, determining a conversion model for each color using RGB values and the color-measurement values. At 710, a first primary color of the red, green, blue primary colors is selected for characterization. At 720, the method includes illuminating a display device using an input light beam of a primary color having spectral properties representative of a light beam in a virtual image in a wearable device. At 730, the method includes capturing, with the digital color camera, an image of the display device; determining, from the image, RGB values for each primary color. At 740 the method includes capturing, with a color-measurement device, a color-measurement value associated with each corresponding primary color at the display device, thereby acquiring a color-measurement value in an absolute color space. At 750, a conversion model for each color is determined using RGB values and the color-measurement values. At 760, the process is repeated for another of the primary colors. The method can be implemented using the system depicted above in connection with FIG. 6, and is described in more detail below.

At 720, the method includes illuminating a display device using an input light beam of a primary color having spectral properties representative of a light beam in a virtual image in a wearable device. The input light beam can be provided using a light source and a spectral modification device that provide narrowed and shifted spectral bands representative of the virtual image. The light source can be an LED, a laser, or a monochromator. The spectral modification device can include one or more of a lens system and a filter. Further varieties in spectral content of the input light beam is possible by one or more of the following processes: altering power to the light source, applying pulse-width-modulation (PWM) of the light source, filtering the light source, and combining two or more light sources. These parameters can be varied to generate spanning the range of expected virtual image primary colors.

At 730, the method includes capturing, with the digital color camera, an image of the display device; determining, from the image, RGB values for each primary color. The display device can be an integrating sphere or a projection screen.

At 740 the method includes capturing, with a color-measurement device, a color-measurement value associated with each corresponding primary color at the display device, thereby acquiring a color-measurement value in an absolute color space. The color-measurement device can be a spectroradiometer or a colorimeter, and the color-measurement value in an absolute color space comprises spectrum or XYZ values. The color-measurement value in an absolute color space comprises CIE XYZ, CIE xyY, CIELUV, CIELab, or LCh values.

At 750, a conversion model for each color is determined using RGB values and the color-measurement values. For example, the conversion model for the display device comprises a 3-by-3 matrix. The display device is an integrating sphere or a projection screen. The 3-by-3 matrix can be calculated using a regression method, such as least square, linear regression, polynomial regression, or neural networks, etc. The process of determining a conversion model for each color can include assembling training data from the captured images in the digital color camera's RGB space and corresponding spectroradiometer measurements in absolute XYZ space, and applying a conversion method to generate the conversion model from converting RGB training data to XYZ training data. The conversion method can also include applying k-fold cross validation, or leave-one-out cross validation.

In the embodiments described above, the image light generated by the wearable display device may include light in the three primary colors, namely blue (B), green (G), and red (R). The wearable display device can also have a "primary" color that is a mixture of the display system's native (most saturated) source colors. For example, it may be desirable to mix a small amount of green to red to create a less saturated red primary color in the display. This can be accomplished by turning on a green LED during the red LED's field sequential period. This can also be accomplished by adding an extra green luminance to the green field sequential color period, by utilizing higher LCOS gray levels, or by increasing the LED optical power during the green period. This "mixture primary" can also have a color that is close to white (approximately equal amounts of red, green, blue). In these cases, the camera can be calibrated in the same manner as described above, by determining a conversion model from camera RGB to absolute XYZ for the "mixture primary".

Figure 8:
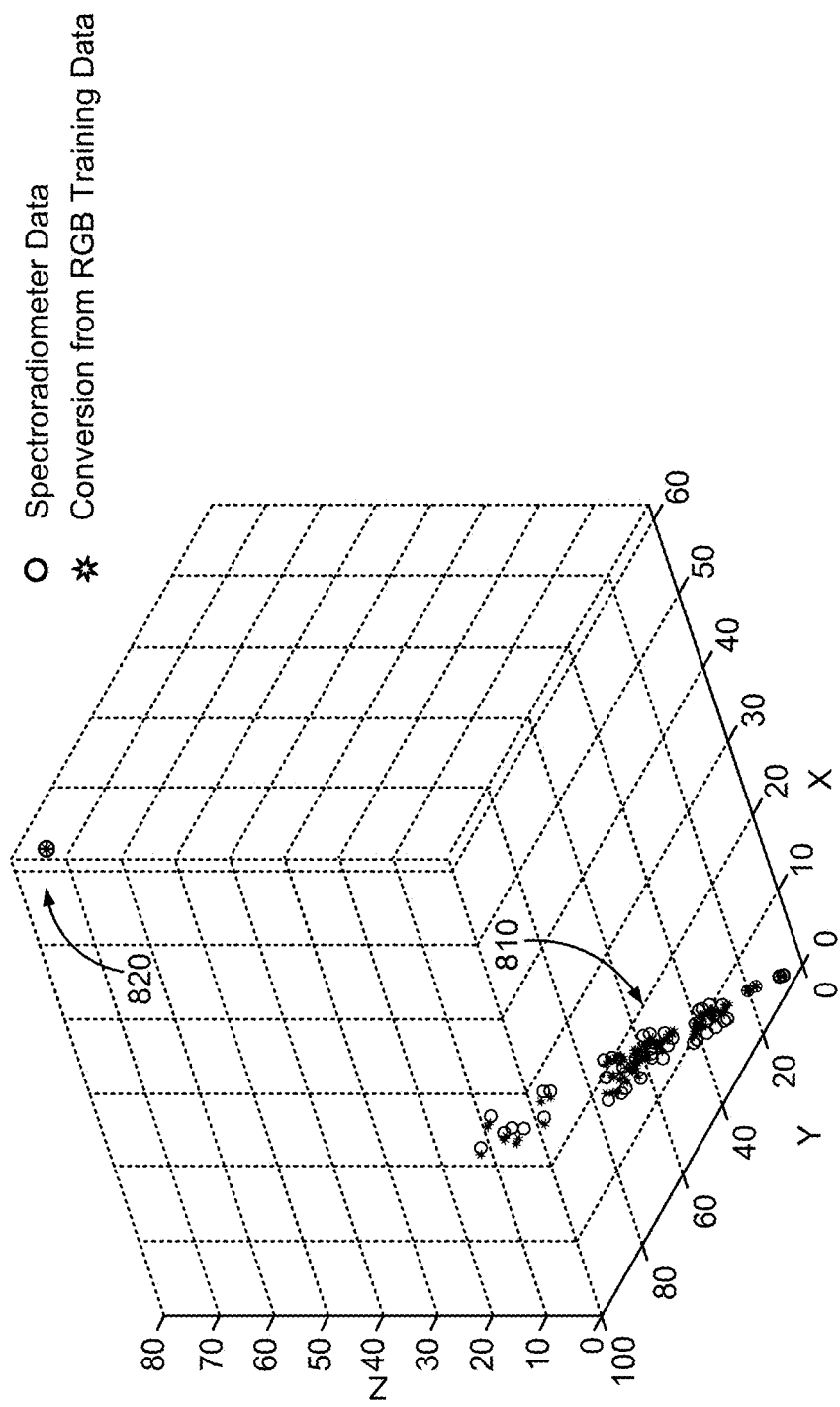
FIG. 8 is a diagram illustrating an example of the result of the RGB to XYZ conversion method described above according to some embodiments of the invention.

FIG. 8 is a diagram illustrating an example of the result of the RGB to XYZ conversion method described above according to some embodiments of the invention. In FIG. 8, the data points in XYZ color space measured by the spectroradiometer 650 of FIG. 6 for a set of training samples in the XYZ coordinates are shown in circles (°). The RGB data for the same training samples measured by digital color camera 640 are converted to the XYZ color space using the conversion matrices Mred, Mgrn, and Mblu described above. The converted camera data in the XYZ color space are shown in asterisks (*) in FIG. 8. The data points 810 in the lower left hand corner are in the green color region, and the data points 820 at the upper right hand corner represent a whiter color. It can be seen that good matches can be achieved over a wide range of the XYZ color space.

In embodiments of the invention, the results show that the RGB to XYZ conversion matrix elements have similar order, implying stability. Further, training validation was found to meet cross-validation requirements for good fit. Measured standard deviation from target in the validation set is low. Samples in the validation set also included LEDs that were not used in the process of conversion using least-squares fit.

Figure 9:
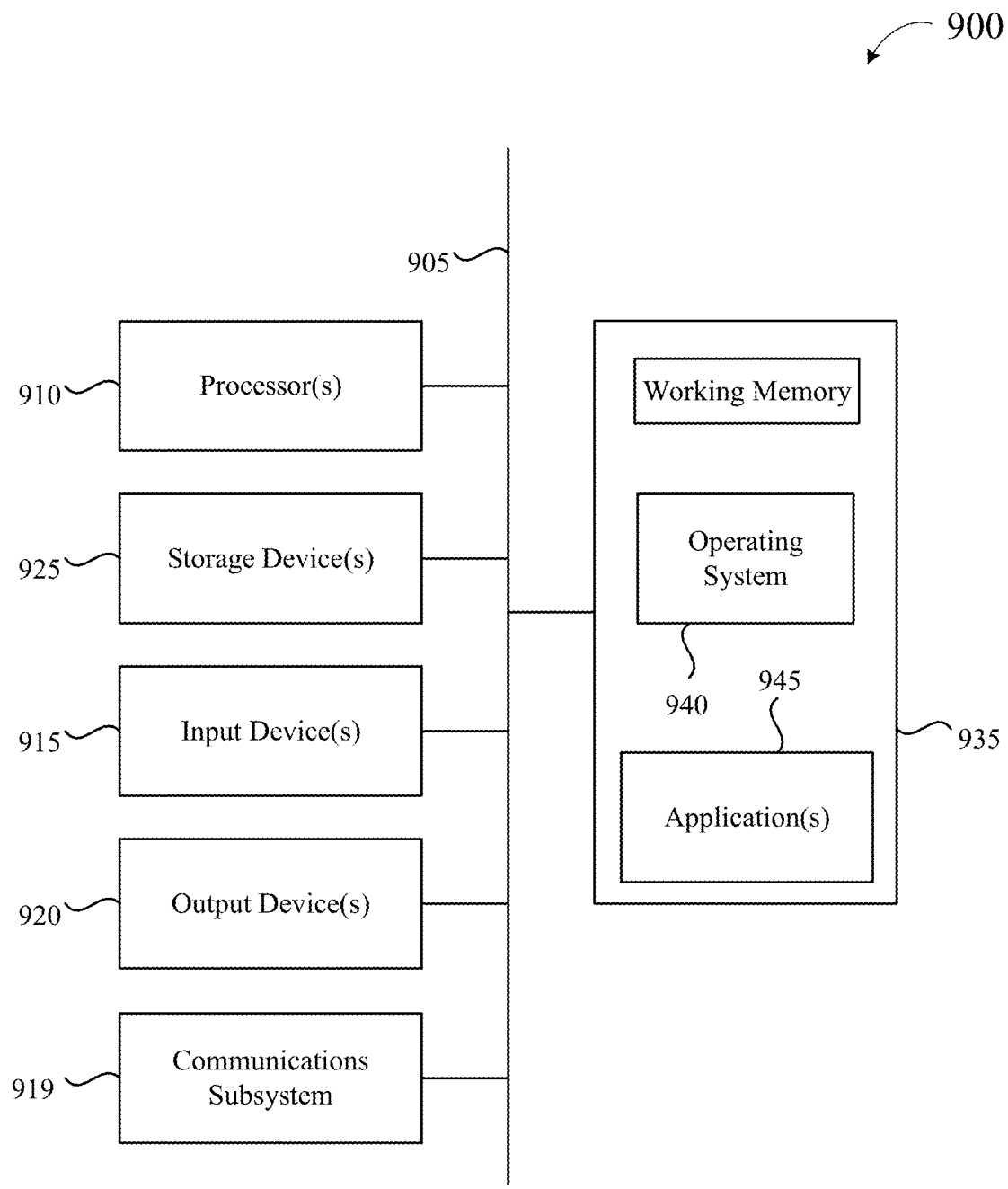
FIG. 9 illustrates a simplified computer system according to an embodiment described herein.

FIG. 9 illustrates a simplified computer system 900 according to an embodiment described herein. Computer system 900 as illustrated in FIG. 9 may be incorporated into devices such as the wearable display devices as described herein. FIG. 9 provides a schematic illustration of one embodiment of computer system 900 that can perform some or all of the steps of the methods provided by various embodiments. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

Computer system 900 is shown comprising hardware elements that can be electrically coupled via a bus 905, or may otherwise be in communication, as appropriate. The hardware elements may include one or more processors 910, including without limitation one or more general-purpose processors and/or one or more special-purpose processors such as digital signal processing chips, graphics acceleration processors, and/or the like; one or more input devices 915, which can include without limitation a mouse, a keyboard, a camera, and/or the like; and one or more output devices 920, which can include without limitation a display device, a printer, and/or the like.

Computer system 900 may further include and/or be in communication with one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 900 might also include a communications subsystem 919, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 919 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 919. In other embodiments, a portable electronic device, e.g. the first electronic device, may be incorporated into computer system 900, e.g., an electronic device as an input device 915. In some embodiments, computer system 900 will further comprise a working memory 935, which can include a RAM or ROM device, as described above.

Computer system 900 also can include software elements, shown as being currently located within the working memory 935, including an operating system 940, device drivers, executable libraries, and/or other code, such as one or more application programs 945, which may comprise computer programs provided by various embodiments, and/ or may be designed to implement methods, and/or configure systems, provided by other embodiments, as described herein. Merely by way of example, one or more procedures described with respect to the methods discussed above, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 925 described above. In some cases, the storage medium might be incorporated within a computer system, such as computer system 900. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 900 and/or might take the form of source and/or installable code, which, upon compilation and/or installation on computer system 900 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as computer system 900 to perform methods in accordance with various embodiments of the technology. According to a set of embodiments, some or all of the procedures of such methods are performed by computer system 900 in response to processor 910 executing one or more sequences of one or more instructions, which might be incorporated into the operating system 940 and/or other code, such as an application program 945, contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM (compact disc read only memory), any other optical medium, punchcards, papertape, any other physical medium with patterns of holes, a RAM, a PROM, EPROM (erasable programmable read-only memory), a FLASH-EPROM (Flash erasable programmable read-only memory), any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 900.

The communications subsystem 919 and/or components thereof generally will receive signals, and the bus 905 then might carry the signals and/or the data, instructions, etc. carried by the signals to the working memory 935, from which the processor(s) 910 retrieves and executes the instructions. The instructions received by the working memory 935 may optionally be stored on a non-transitory storage device 925 either before or after execution by the processor(s) 910.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

What is claimed is:

1. A method for utilizing a color camera for measuring chromaticity and luminance of a virtual image generated by a device, wherein the the method comprises:

illuminating an integrating sphere or a projection screen with narrowband light sources that correspond to light sources in the device that generate the virtual image, or having spectral bands that are characteristic of spectral bands emerging from the virtual image, wherein the device includes a field sequential color display illuminated by narrowband sources and a waveguide type optical element for displaying the virtual image over a field of view, the waveguide type optical element having properties that further narrow and spectrally shift dominant wavelength, saturation, and hue of light over the field of view of the virtual image, wherein the waveguide type optical element includes diffractive structures;

adding dichroic filters, and rotating the dichroic filters, prior to the integrating sphere or the projection screen to mimic bandwidth narrowing and spectrally shifted dominant wavelength of light in the virtual image;

using the color camera to capture images of the integrating sphere or screen at a conjugate distance close to a virtual image distance, the color camera characterized by an RGB (red green blue) color space;

focusing the color camera close to a virtual image plane;

in parallel, using a spectroradiometer to capture a spectrum and/or values in CIE XYZ color space of light at the integrating sphere or screen;

focusing the spectroradiometer at the integrating sphere or projection screen;

capturing images from the color camera and spectral data from the spectroradiometer at separate primary colors (red, green, or blue), which are close to primary colors expected for field sequential display of the virtual image;

creating a conversion model from the camera's RGB color space to XYZ absolute color space for each virtual image primary color by:
  assembling training samples from captured images and corresponding spectroradiometer measurements in the camera's RGB color space and spectroradiometer's XYZ space;
  applying conversion methods, including one or more of linear regression, polynomial regression, or neural networks, to generate a transformation from RGB training data to XYZ training data;
  applying methods, including one or more of a k-fold cross validation or leave-one-out cross validation, to further optimize robustness and accuracy of the conversion model; and
applying the conversion model to the color camera for measuring absolute chromaticity and luminance of the virtual images.

2. The method of claim 1, wherein the narrowband light sources comprise LEDs, lasers, or a monochromator.

3. The method of claim 1, further comprising converting spectrum or XYZ values to values in an absolute color space, the values in the absolute color space including one or more of values in CIE XYZ (CIE XYZ color space), CIE xyY (CIE xyY color space), CIELUV (CIE 1976 L*, u*, v* color space), CIELab (CIE L*a*b* color space), or LCh (CIE L*C*h* color space).

4. The method of claim 1, further comprising providing variations in primary color spectral content by one or more of altering power to the narrowband light sources, applying pulse-width-modulation of the narrowband light sources, filtering the narrowband light sources, or combining two or more narrowband light sources to provide data spanning a range of expected virtual image primaries.

5. A method for characterizing a digital color camera, comprising: for each of three primary colors used in a field sequential color virtual image: illuminating a display device using an input light beam of a primary color having spectral properties representative of a light beam in a virtual image in a wearable device; capturing, with the digital color camera, an image of the display device, the digital color camera characterized in an RGB (red green blue) color space; determining, from the image, RGB values for each primary color; capturing, with a color-measurement device, a color-measurement value associated with each corresponding primary color at the display device, thereby acquiring the color-measurement value in an absolute color space; determining a conversion model for each color using the RGB values and the color-measurement values by assembling training data from captured images in the RGB color space of the digital color camera and corresponding spectroradiometer measurements in absolute XYZ space; and applying a conversion method, including one or more of linear regression, polynomial regression, or neural networks, to generate the conversion model from converting RGB training data to XYZ training data; and outputting the conversion model to the digital color camera for use in correcting measurements of absolute chromaticity and luminance of the virtual image in the wearable device.

6. The method of claim 5, wherein the method comprises determining the conversion model for each of red, green, and blue primary colors.

7. The method of claim 5, further comprising providing the input light beam using a light source and a spectral modification device that provide narrowed and shifted spectral bands representative of the virtual image.

8. The method of claim 5, wherein the display device is an integrating sphere or a projection screen.

9. The method of claim 5, wherein the color-measurement device is a spectroradiometer or a colorimeter.

10. The method of claim 5, wherein the conversion model for the display device comprises a 3-by-3 matrix.

11. The method of claim 5, wherein the color-measurement value in the absolute color space comprises spectrum or XYZ values.

12. The method of claim 5, wherein the color-measurement value in the absolute color space comprises values in CIE XYZ (CIE XYZ color space), CIE xyY (CIE xyY color space), CIELUV (CIE 1976 L*, u*, v* color space), CIELab (CIE L*a*b* color space), or LCh (CIE L*C*h* color space).

13. A system for characterizing a digital color camera, the system comprising:
  a light source for projecting an image;
  a spectral modification device;
  an integrating sphere;
  a digital color camera configured to capture RGB (red green blue) values of the image at each pixel for each color;
  a spectroradiometer configured to determine color-measurement values of the image in an absolute color space;
  a processor; and
  a non-transitory computer-readable memory comprising instructions that, when executed by the processor, cause the processor to perform operations including:
    determining a conversion model between RGB values of the image captured by the digital color camera and the color-measurement values of the image in the absolute color space determined by the spectroradiometer for each of three primary colors used in a field sequential color virtual image by:
      assembling training data from captured images from the digital color camera and corresponding spectroradiometer measurements in the absolute color space; and
      applying a conversion method, including one or more of linear regression, polynomial regression, or neural networks, to generate the conversion model from converting RGB training data to XYZ training data; and
    outputting the conversion model to the digital color camera for use in correcting measurements of absolute chromaticity and luminance of the field sequential color virtual image output by a wearable device.

14. The system of claim 13, wherein the system is configured to provide an input light beam using the light source and the spectral modification device that provide narrowed and shifted spectral bands representative of the field sequential color virtual image.

15. The system of claim 13, wherein the light source is an LED (light emitting diode), a laser, or a monochromator.

16. The system of claim 13, wherein the conversion model comprises a 3-by-3 matrix.

17. The system of claim 13, wherein the color-measurement values of the image in the absolute color space comprise spectrum or XYZ values.

18. The system of claim 13, wherein the color-measurement values of the image in the absolute color space comprise values in CIE XYZ (CIE XYZ color space), CIE xyY (CIE xyY color space), CIELUV (CIE 1976 L*, u*, v* color space), CIELab (CIE L*a*b* color space), or LCh (CIE L*C*h* color space).

* * * * *

UNITED STATES PATENT AND TRADEMARK OFFICE
CERTIFICATE OF CORRECTION

| | |
|---|---|
| PATENT NO. | : 12,019,239 B2 |
| APPLICATION NO. | : 17/154895 |
| DATED | : June 25, 2024 |
| INVENTOR(S) | : Schuck, III et al. |

It is certified that error appears in the above-identified patent and that said Letters Patent is hereby corrected as shown below:

In the Claims

In Column 18, Line 53, Claim 1: delete "the" after "the."

Signed and Sealed this
Tenth Day of September, 2024

Katherine Kelly Vidal
*Director of the United States Patent and Trademark Office*